April 16, 1968 J. GREENE, JR 3,378,312
AIR BLEEDER DEVICE
Filed March 5, 1965
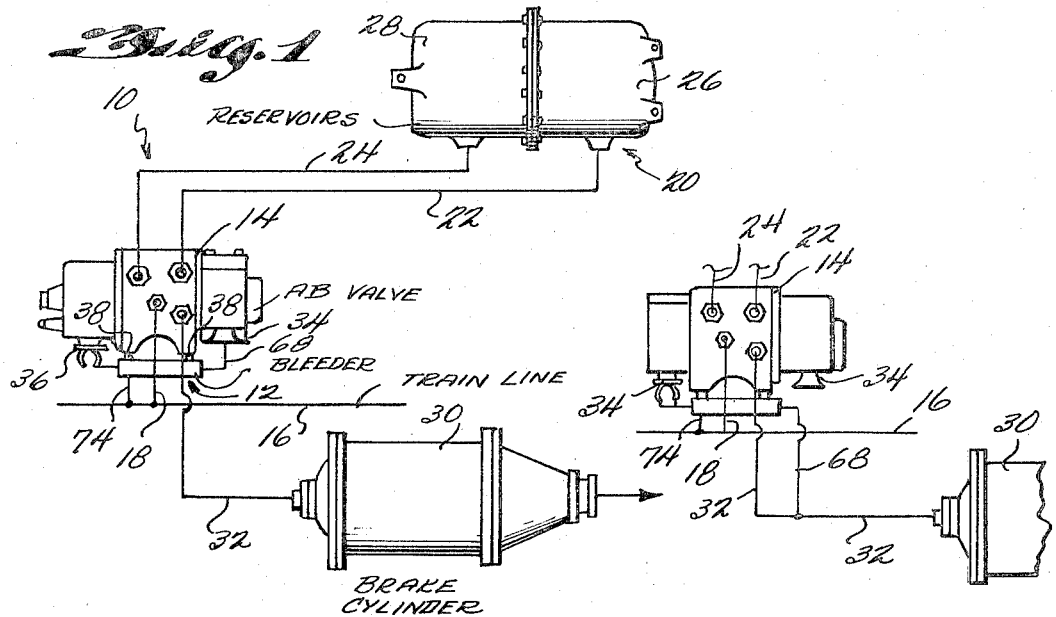
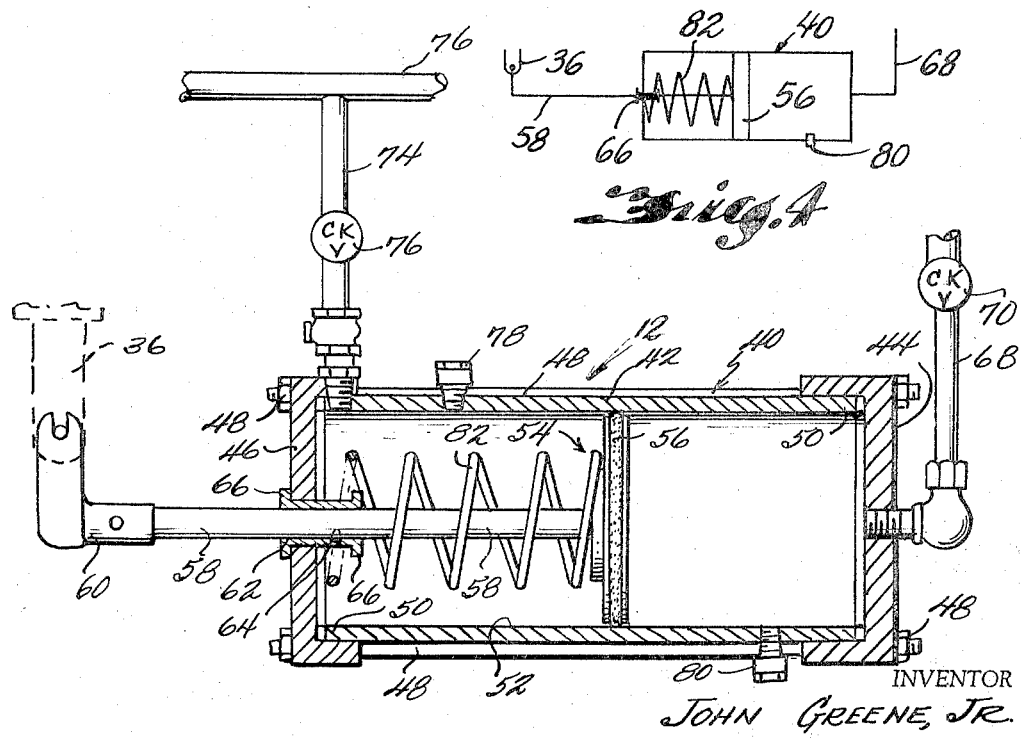
INVENTOR
JOHN GREENE, JR.
BY
Cushman, Darby & Cushman
ATTORNEYS

3,378,312
AIR BLEEDER DEVICE
John Greene, Jr., Birmingham, Ala., assignor of fifty percent to Gregory S. Prince
Filed Mar. 5, 1965, Ser. No. 437,438
7 Claims. (Cl. 303—70)

ABSTRACT OF THE DISCLOSURE

An apparatus for operating the vent valve associated with a reservoir and multiple brake valve on a railway car. A piston of a piston and cylinder means is connected to operate the vent valve to release pressure from the reservoir. The piston is biased to a predetermined degree to an inoperative position as long as a normal brake pressure is used in the brake system. The piston is responsive to the pressure in the brake cylinder and will operate the vent valve when the pressure in the brake system is increased above normal and an emergency brake application made.

---

This invention relates to automatic air brake systems for railroad trains and more particularly to an automatic air bleeder device by which compressed air can be automatically vented from the compressed air reservoirs of each car by actuation from a central location.

In conventional automatic air brake systems for railroad trains, such as the Westinghouse system, the application and release of the brakes are controlled by variations in pressure of the compressed air employed in the brake systems. Basically, the Westinghouse air brake system has a source of compressed air which is operatively connected to the brake cylinders on each car through a brake line, compressed air reservoirs and an AB valve. The compressed air employed in the brake cylinders is stored locally on each car in reservoirs called the emergency and auxiliary reservoirs. The brake cylinder has a brake piston slidably positioned therein which operates a system of levers which apply pressure to the brake discs on the car axles or the brake shoes on the tread of the wheels of the individual railroad cars. The brake is released by exhausting the air from the brake cylinder and returning the piston to release position by means of a spring in the cylinder.

In operation, the reduction of pressure in the train line at a central location moves the AB valve piston connected to a slide valve, not shown in detail in this application, in such a way as to connect ports with passages between the reservoirs and the brake cylinder. In order to release the brakes the pressure of the compressed air in the train line is increased thereby moving the AB valve mechanism into a position in which compressed air is vented from the brake cylinder through the AB valve to the atmosphere. During brake release the pressure in the train line is increased and compressed air flows from the brake pipe through the AB valve into the air reservoirs in order to restore the pressure of compressed air for use in the next application of the brakes.

In an emergency application of the brakes the primary desire is to make the operations involved in the ordinary application of the brakes, called a service application, occur in such a way as to increase the braking pressure to the maximum possible. Accordingly, an emergency application of the brakes is initiated by a greater and more rapid reduction of air pressure in the train line from a central location than is used with a service application of the brakes. This greater and more rapid reduction of pressure moves the AB valve into a position in which air is also locally vented from the brake pipe through the AB valve system to the atmosphere on each car thereby rapidly moving the AB valve mechanism into a position in which both the emergency and the service reservoirs are opened to the brake cylinder through ports in the AB valve. Accordingly, the pressure of the compressed air in the brake cylinder will be rapidly increased to a point at which the brakes are fully applied. It will be appreciated that the above discussion is an over simplification of the entire Westinghouse air brake system; however, such a basic discussion should provide an adequate background for incorporating the automatic air bleeder device disclosed herein into the air brake system.

When a train is broken up and the cars are shunted into a railroad yard, it is necessary to carry on these operations with the brakes in a released position inasmuch as the brake pipe of the switching engine may not be connected with the brake pipe of the air brake system of the individual cars. Before a train is broken up, the brakes have probably been previously applied in order to stop the train. If the brakes have not been applied, they will be applied as soon as the brake pipe hose connection is broken next to the locomotive inasmuch as this results in a rapid loss of pressure in the brake pipe thereby actuating the brakes in a manner illustrated above. Furthermore, if an attempt is made to close off the brake pipe before uncoupling the engine, the compressed air will gradually leak out of the brake system causing a reduction in pressure therein and applying the brakes in a manner described above. In order to assure that the brakes will be released, it is necessary to release the compressed air from the brake cylinder. Heretofore, this operation has been accomplished manually by having someone release a hand valve so as to exhaust the compressed air from the brake cylinders and reservoirs on each car. Certainly, this operation requires a great deal of time and expense if the train is a long freight train of a hundred cars or more. Attempts have been made to provide means by which the compressed air could be discharged from the reservoirs from a central location, such as the engine, as illustrated in the patent to Parsons, 3,123,409, of Mar. 3, 1964. Such devices, however, must combine simplicity in construction so as to keep the cost relatively low and so as to avoid parts which might become easily damaged. It is within this area that the prior inventions have failed to provide adequate solutions to the problem. Therefore, it is an object of this invention to provide an automatic air bleeder device of relatively low cost and of simplicity and ruggedness in construction.

Furthermore, it is an object of this invention to provide an attachment which can easily be adapted to the present air brake systems so that it can be applied to existing cars with a minimum amount of expense and a minimum amount of changes.

A further object of this invention is to provide an automatic bleeder device for the air reservoirs which can be operated from a central location, the locomotive in this case, by one man and which will not interfere with the ordinary operation of the air brake system.

It is an object of this invention to actuate a valve operating member for unseating a vent valve and thereby opening the brake cylinder and air reservoirs to the atmosphere by merely using the compressed air of the train line which has had its pressure varied and which actuates the valve operating member.

Accordingly, it is an object of this invention to provide a method of unseating a vent valve from a central location for venting compressed air from air reservoir means comprising the steps of varying the pressure of the compressed air of the train line from the normal pressure thereof, exhausting a portion of the compressed air of varied pressure from the train line, entrapping at least a portion of the exhausted compressed air and directing it to a valve operating member, which upon actuation, will unseat the vent valve and thereby open the air reservoirs to the atmosphere.

It is a further object of this invention to actuate the valve operating member, which in turn unseats the vent valve to exhaust compressed air from the air reservoirs to the atmosphere, by subjecting the valve operating member to unequal air pressure thereby causing the valve to move in an operative direction.

More specifically, it is an object of this invention to utilize the localized exhausted compressed air, which is exhausted through the AB valve during an emergency application, for actuating the piston within a cylinder, which in turn unseats a vent valve for venting the compressed air from the air reservoirs.

Likewise, a portion of the air being directed into the brake cylinders from the AB valve and the reservoir means can also be used for actuating the valve operating member.

It is a further object of this invention to provide an apparatus for accomplishing all of the methods set forth in this application for exhausting compressed air from the air reservoir means.

These and other objects of this invention are more clearly depicted in the following detailed description having specific reference to the attached drawings in which the embodiments of the invention are shown, not to limit the scope of the invention in any respect but so that the principles thereof might be more clearly demonstrated.

In the drawings:

FIGURE 1 is a schematic drawing showing the air bleeder device incorporated into an air brake system;

FIGURE 2 is a side elevational view of the air bleeder device partly in section; and FIGURE 3 is a partial schematic drawing showing a modification in the connection of the air bleeder device in an air brake system;

FIGURE 4 is a schematic drawing showing a modification of the bleeder device and its connection in the air brake system.

FIGURE 1 is a schematic drawing of an air brake system 10 using the improved compressed air bleeder device 12. Compressed air is directed from a source (not shown) to a multiple valve means 14, such as the Westinghouse AB valve used on freight trains, by the train line 16 and branch pipes 18 leading from the train line to the multiple valve means 14 on each car. The multiple valve means 14 is connected to a compressed air reservoir means 20 by conduits 22 and 24. The compressed air reservoir means 20 comprises an auxiliary reservoir 26 and an emergency reservoir 28. The AB valve is also connected to a brake cylinder 30 by conduit 32 and passes compressed air into the brake cylinder 30 so as to operate it in a manner well-known in the art.

The multiple valve means or AB valve 14 has an emergency exhaust port 34 through which compressed air from the train line 16 and the branch pipe 18 is locally exhausted to the atmosphere as well as some compressed air from the quick action chamber, not shown, within the AB valve when the brake system is thrown into an emergency application. Likewise, the multiple valve means 14 has a vent valve 36 associated therewith which is operatively connected to the reservoir means so as to exhaust compressed air therefrom when unseated. Other features of the Westinghouse AB valve, such as the release control retainer, have not been shown, as they do not affect the operation of the air bleeder device.

The new bleeder device 12 is preferably secured to the AB valve by brackets 38 in such a position that it is operatively associated with the vent valve 36. As shown more particularly in FIGURE 2, the bleeder device includes a cylinder means 40 comprising a cylindrical side wall 42 having a first end plate 44 and a second end plate 46 joined together by bolt means 48 and held secured to washers 49 abutting the oppositely disposed ends 50 of the cylindrical side wall 42. The first and second end plates define respectively the first and second ends of the cylinder means and together with the cylindrical side wall define a cavity 52 within the cylinder means having a piston means 54 slidably positioned therein.

The piston means 54 comprises a piston head 56 disposed transversely across the cavity 52 and having a piston stem 58 secured thereto. The piston stem 58 extends through the second end 46 of the cylinder means and is connected at its free end 60 to the vent valve 36 in a manner such that axial movement of the piston will unseat the vent valve. It will be appreciated that this connection could take various forms well-known in the art depending on the type of vent valve used with the multiple valve means. For instance, the connection could be a straight connection or a bell crank connection. In the preferred form of the embodiment, the connection between the piston stem and the vent valve is such that the piston stem must retain the vent valve in its unseated position until all the compressed air is drained therefrom. However, it is possible to design the vent valve and the connection between the vent valve and the piston stem such so that once the vent valve has been unseated, it will remain unseated independently of the position of the piston stem until all of the compressed air is drained out of the reservoir means. Accordingly, it would not be necessary to maintain the piston stem in its operative position throughout the entire operation of venting compressed air from the reservoir means.

With most connections unlimited axial movement of the piston stem 58 would subject the vent valve 36 to undue stress and, in some instances, actually break the vent valve. Accordingly, means 62, such as a sleeve guide, is provided to limit the axial movement of the piston. The limiting means 62 is associated with the piston stem and a stationary body so as to limit the movement of the piston stem. As illustrated, the sleeve is secured by a set screw 64 to piston stem and has upwardly extending end portions 66 which abut the second end plate 46 of the cylinder means 40 so as to limit movement of the piston stem to the space between the axially disposed, upwardly extending end portions 66 of the sleeve 62.

It is necessary to provide means to move the piston stem 58 into an operative position with respect to the vent valve 36. In order to simplify the invention and make it commercially attractive, it is preferable that this means comprise the compressed air of the air brake system. Accordingly, first conduit means 68 extend from the first end of the cylinder means 40 to the multiple valve means 14 for conveying compressed air passing through the multiple valve means to the first end of the cylinder. This compressed air acts against the piston head 56 and moves the piston stem 58 into an operative position for unseating the vent valve 36. As illustrated, the first conduit means 68 is connected to the emergency exhaust port 34. A first check valve 70 is positioned within the first conduit means 68 so as to allow compressed air to pass into the cylinder means 40 while preventing the escape of compressed air from the cylinder means to the emergency exhaust port.

FIGURE 3 shows another modification in which the first conduit means 68 is attached to the conduit 32 passing from the multiple valve means 14 to the brake cylinder 30 so as to convey compressed air from the reservoirs 20 through the multiple valve means 14 and into the brake cylinder 30. Moreover, it is evident that the first conduit means 68 could also be attached to the brake cylinder itself and accomplish the same result. However, tapping the conduit 32 would probably be an easier and less expensive means of attaching this device to an existing air brake system. Again a first check valve 70 would be positioned within the first conduit means 68 so as to allow compressed air to flow into the cylinder means.

As will be explained in greater detail during a discussion of the method of operation of this bleeder device, it is preferable to include means to resist the movement of the piston means 54 in an operative direction inasmuch as it is not always desirable to actuate the piston means when it is subjected to compressed air. As stated above, in order to simplify the invention and make it commercially feasible, the resistance means preferably comprises the compressed air from the air brake system. Accordingly, a second conduit means 74 extends from the second end 46 to the cylinder means 40 to the train line 16 so that compressed air can pass from the train line into the second end of the cylinder means. A second check valve 76 is positioned within the second conduit means for allowing compressed air to pass into the cylinder means while preventing compressed air from escaping from the cylinder means to the train line. A relief valve 78 is operatively associated with the second end of the conduit means for preventing the pressure of the compressed air from getting above a predetermined set pressure. As illustrated, the relief valve 78 is secured, as by a threaded connection, in the side wall 42 of the cylinder means for connecting the cavity 52 to the atmosphere. Of course, the relief valve 78 could be secured in the second end plate 46.

When compressed air enters the first end of the cylinder means and moves the piston into an operative position in which the vent valve 36 is unseated, it is realized that at some subsequent time it will be necessary to return the piston to its original position and reseat the vent valve 36. Therefore, in order to effect the return of the piston to its original position, it will be necessary to reduce the pressure of the compressed air in the first end 44 of the cylinder means, or in what might be called the operative end of the cylinder means or operative side of the piston means. Accordingly, a small vent valve 80, associated with the first end 44 of the cylinder means 40, is provided for exhausting air slowly from the first end of the cylinder means to the atmosphere. Thus, the pressure in the second end of the cylinder means would soon become greater than the pressure in the first end and effect the return of the piston means to its original position. A spring means 82, such as a coiled compression spring, could also be employed to aid in returning the piston to its original position as soon as the pressure of the compressed air in the first end of the cylinder means becomes low enough to be overcome by the spring means.

It will also be seen that the second conduit means 74 and relief valve 78 could be eliminated entirely, as illustrated schematically in FIGURE 4 with the construction of the identified parts being similar to the corresponding parts in FIGURE 2. The spring means could provide the necessary resistance to the piston means for retaining it in its original position until the pressure in the first end of the cylinder means becomes sufficiently great to overcome the pressure of the spring means. However, the utilization of a pressure calibrated spring means, which would be responsive to pressure reaching a predetermined point, might increase the cost of the bleeder device.

While the bleeder device has been illustrated by a cylinder and piston means in which the first end of the cylinder means is the operative end and in which the piston pushes the valve into an unseated position, it will be appreciated that by simple mechanical rearrangement of the parts of the apparatus the bleeder device can be operated so that the second end of the cylinder means is the operative end and the vent valve is pulled into an unseated position. Essentially, the bleeder device is employing a pressure differential responsive valve in which the pressure differential, in an operative direction and of a specified amount, operatively causes the vent valve to be unseated.

In operation the pressure of the compressed air of the train line is varied from the normal pressure thereof, and as illustrated, the pressure is increased. Thus, if the normal pressure of the train line is 70 p.s.i., the pressure might be increased to 85–90 p.s.i. A portion of the compressed air of varied pressure is then exhausted from the train line at one exhaust location, the exhaustion being effected from a central location, such as the engine. In most instances, the exhaustion occurs because the engineer throws a valve in the engine which opens the train line at least partially to the atmosphere. However, if the train should be broken apart, the break would establish the central location from which compressed air would escape to the atmosphere. The exhausting of compressed air throws the air brake system into a braking situation. If compressed air is exhausted rapidly from the train line, an emergency application of the brakes would be effected. A gradual reduction of compressed air from the brake line effects a service application of the brakes. Nevertheless, during each braking situation the train line is closed from communication with the air reservoirs or the brake cylinder.

The next step in the unseating of the vent valve 36 is to direct a portion of the compressed air of the air brake system to a valve operating member on each railroad car, which in this case is the cylinder and piston means. As illustrated, this portion of the compressed air is directed to the first end of the cylinder means through the first conduit means 68. In one embodiment of the invention, the first conduit means is connected to the emergency exhaust port through which compressed air is exhausted during an emergency application, as is well-known by persons skilled in the art.

For instance, with a Westinghouse AB valve, the rapid reduction of air pressure in the train line causes the AB valve to be thrown into a position in which compressed air from the branch pipe and the train line is exhausted through the emergency exhaust port so as to effect a rapid reduction of air pressure in the train line throughout the entire system. This is effectively accomplished because the AB valve on each railroad car is locally exhausting compressed air from the train line through the emergency exhaust port while at the same time compressed air is additionally being exhausted from the train line at another spot through the actuation of a valve in the engine or through a break in the train line. During one stage of an emergency application, the compressed air being exhausted through the emergency exhaust port is combined with the compressed air coming from a quick action chamber within the AB valve itself. The compressed air which is exhausted through the emergency exhaust port is directed to the first end of the cylinder means for actuating the valve operating member which, as illustrated, is the piston means. A check valve is positioned within the first conduit means to prevent the compressed air from flowing back into the AB valve.

It will be appreciated that one of the primary concerns with the operation of a device of this type is to have a system which will not affect the normal operation of the air brake system. Accordingly, the bleeder device must not interfere with the exhaustion of compressed air through the emergency exhaust port in such a manner that an emergency application of the brakes could not be effected. Therefore, the volume of the first side of the cylinder means must be sufficiently large to receive the necessary amount of compressed air for enabling the emergency application to be accomplished. It should further be apparent that this requirement may result in the first side of the cylinder means being larger than the second side of the cylinder means with the result that the casing for the pressure differential valve might not take the form of a cylinder but rather might involve a differential piston arrangement of some type well-known in the art.

It may be desirable to use the modified device schematically shown in FIGURE 3 in which the first conduit means 68 is attached to the conduit 32 extending between the AB valve and the brake cylinder. Accordingly, when compressed air is exhausted from the train line at a central location, compressed air is directed from the reservoir means through the AB valve to the brake cylinder, regardless of whether a service application or an emergency application is made. In this instance, a portion of the compressed air which is directed to the brake cylinder flows through the first conduit means to the first end of the cylinder means. Again, a check valve, positioned within the first conduit means, prevents the compressed air from flowing back to the AB valve when air is exhausted from the brake cylinder and the reservoir means.

Broadly, therefore, we have now described the manner in which compressed air of varied pressure is directed to the valve operating member. The compressed air of, for instance, increased pressure, actuates the valve operating member, namely, the cylinder and piston means, to unseat the vent valve 36 and open the air reservoir means of each car to the atmosphere. As illustrated, means is provided for restraining the movement of the valve operating member until it is subjected to increased pressure on its first side. In the preferred embodiment of the invention, this involves the step of directing compressed air from the train line to the second side of the piston prior to the introduction of compressed air of increased pressure to the first side of the piston, the compressed air providing the resistance means for the piston.

A check valve positioned within the conduit means leading from the train line to the second end of the cylinder prevents air from being exhausted from the cylinder when compressed air is exhausted from the train line. Furthermore, it is necessary to reduce the pressure of compressed air directed to the second side of the piston prior to the introduction of compressed air of increased pressure to the first side of the piston so that a pressure differential will be created which enables the piston to be moved in an operative direction. Thus, the pressure on the second side of the piston is preferably maintained at approximately the normal pressure of the compressed air in the train line by means such as a relief valve 78. Of course, if the second conduit means and relief valve are eliminated, a spring having approximately the same resistance as the compressed air under normal pressure might be used.

An examination of the above-described system will show that it cannot be operated except upon the steps of first increasing the air pressure of the train line above that normally carried therein and then applying either an emergency or service application of the brakes, depending on the type of system used. In normal operation, the pressure of the compressed air in the train line would not be increased above that which is normally carried therein. Accordingly, during a service application of the brakes in one embodiment, no compressed air would be directed to the first side of the piston, while in the embodiment shown in FIGURE 3, compressed air of normal pressure, for instance, 70 p.s.i., would be directed to the first side of the piston means. However, this compressed air would be offset by the resistance means, such as the compressed air at the normal pressure of the train line which is illustrated as 70 p.s.i. Furthermore, it will be seen that in the embodiment of the invention in which no compressed air is directed to the second side of the piston means, except during an emergency application, the limiting means 62 prevents the piston means from being moved in an axial direction by the compressed air on the second side thereof.

The same basic principles apply in an emergency application of the brakes because, regardless of the embodiment used, the pressure on both sides of the piston means will be equalized at whatever pressure is normally carried in the train line. However, it will be seen that any increase in the pressure of the compressed air will cause the piston means to operate in a manner heretofore explained due to the fact that the relief valve will keep the pressure on the second side of the piston means at a predetermined set pressure, preferably corresponding to the normal pressure carried in the train line.

It will be seen that other modifications may be made to the system above within the scope of this invention. For instance, a valve in the first conduit might be used which allows the passage of compressed air into the cylinder means only upon the compressed air reaching a predetermined pressure. In this instance, the second conduit and relief means could be eliminated, and a spring means used so as to return the piston to its original position when the pressure in the first side of the cylinder becomes reduced sufficiently to allow the spring means to move the piston. In such a situation, it will be seen that the bleeder device is actuated by the application of the brakes so that the train line will not be connected to the compressed air reservoir means.

Likewise, the pressures may be varied from those used as illustrations in the application. It will be appreciated that the relief valve will have to be set at the highest pressure used normally by any railroad system, which may be somewhat higher than 70 p.s.i. Moreover, the pressure to which the compressed air is increased must be within the practical capacity of the train, realizing that there may be a pressure drop along the length of the train and that the increased pressure in the last car must be above the preset pressure of the relief valve.

While a preferred form of the invention has been illustrated in the drawings and discussed above, it should be adequately clear that considerable modification may be made thereto without departing from the principles of the invention. Therefore, the foregoing should be considered in an illustrative sense rather than a limiting sense, and accordingly the extent of this invention should be limited only by the spirit and scope of the claims appended hereto.

I claim:
1. An air brake system for a railroad train comprising: means providing a source of compressed air; multiple valve means operatively connected to the means providing compressed air; a train line connecting the means providing a source of compressed air to the multiple valve means; means defining a compressed air reservoir operatively connected to the source of compressed air through the multiple valve means and the train line, the compressed air reservoir means having a vent valve connecting the reservoir means to the atmosphere when unseated; brake cylinder means operatively connected to the reservoir means through the multiple valve means for receiving compressed air therefrom for actuation; and an air bleeder means for opening the vent valve connecting the air reservoir means to the atmosphere comprising a cylinder means having means defiining a piston receiving cavity, the cylinder means having a first and second end, piston means having a stem extending through the second end of the cylinder means and being operatively connected to the vent valve, first conduit means operatively connecting the first end of the cylinder means to the multiple valve means for carrying compressed air passing through the multiple valve means to the first end of the cylinder means, means for resisting movement of the piston means toward the second end of the cylinder means when compressed air of a predetermined pressure is admitted to the first end of the cylinder means through the first conduit means, the resistance means adapted to be overcome by compressed air of increased pressure above the predetermined pressure thereby allowing the piston to be moved toward the second end of the cylinder means for unseating the vent valve.

2. The apparatus as defined in claim 1 wherein the resistance means comprises a resilient spring of predetermined strength.

3. The apparatus as defined in claim 1 additionally comprising a first check valve means operatively associated with the first conduit means for allowing the passage of compressed air into the cylinder means.

4. The apparatus as defined in claim 1 wherein the first end of the cylinder means has an exhaust opening through which compressed air is alowed to pass slowly for eventually exhausting the compressed air from the first end of the cylinder means thereby allowing the piston means to resume its normal position and allowing the vent valve to reseat so to prevent compressed air from escaping from the reservoir means.

5. The apparatus as defined in claim 1 additionally comprising means associated with the piston stem for limiting the axial movement thereof.

6. The apparatus as defined in claim 1 additionally comprising means for returning the piston means to its normal position thus allowing the vent valve to reseat.

7. An air brake system for a railroad train comprising:
means providing a source of compressed air;
multiple valve means operatively connected to the means providing compressed air, the multiple valve means having an exhaust port for locally exhausting compressed air in an emergency application of the brake system;
a train line connecting the means providing a source of compressed air to the multiple valve means;
means defining a compressed air reservoir operatively connected to the source of compressed air through the multiple valve means and the train line, the compressed air reservoir means having a vent valve connecting the reservoir means to the atmosphere when unseated;
brake cylinder means operatively connected to the reservoir means through the multiple valve means for receiving compressed air therefrom for actuation;
brake cylinder conduit means extending between the multiple valve means and the brake cylinder means for carrying compressed air from the reservoir means; and
air bleeder means for opening the vent valve connecting the air reservoir means to the atmosphere comprising cylinder means having means defining a piston receiving cavity, the cylinder means having a first and second end, piston means having a stem extending through the second end of the cylinder means and being operatively connected to the vent valve, first conduit means connecting the first end of the cylinder means to the brake cylinder conduit means, the first conduit means having a check valve operatively associated therewith for allowing passage of compressed air to the cylinder means, second conduit means connecting the second end of the cylinder means to the train line, the second conduit means having a check valve operatively associated therewith for allowing the passage of compressed air into the cylinder means, relief means associated with the second end of the cylinder means so as to relieve the pressure of the compressed air above a predetermined pressure, means associated with the piston stem for limiting the axial movement thereof, and means for returning the piston means to its normal position thus allowing the vent valve to reseat.

References Cited
UNITED STATES PATENTS

| | | | |
|---|---|---|---|
| 1,494,734 | 5/1924 | Clark | 303—70 |
| 1,638,457 | 8/1927 | Quates | 303—70 |

EUGENE G. BOTZ, *Primary Examiner.*